United States Patent [19]

Chen et al.

[11] 4,231,899

[45] Nov. 4, 1980

[54] METHOD OF PRODUCING A STEAM STABLE ALUMINOSILICATE ZEOLITE CATALYST

[75] Inventors: Nai Y. Chen, Titusville; Joseph N. Miale, Lawrenceville, both of N.J.; William J. Reagan, Yardley, Pa.

[73] Assignee: Mobil Oil Corporation, New York, N.Y.

[21] Appl. No.: 5,279

[22] Filed: Jan. 22, 1979

Related U.S. Application Data

[63] Continuation of Ser. No. 801,881, May 31, 1977, abandoned.

[51] Int. Cl.³ .................. B01J 29/04; B01J 29/28
[52] U.S. Cl. .................................................. 252/455 Z
[58] Field of Search .................................... 252/455 Z

[56] References Cited

U.S. PATENT DOCUMENTS

| | | | |
|---|---|---|---|
| 3,525,775 | 8/1970 | Bolton et al. | 252/455 Z |
| 3,676,330 | 7/1972 | Plank et al. | 252/455 Z |
| 3,758,403 | 9/1973 | Rosinski et al. | 252/455 Z |

*Primary Examiner*—Carl F. Dees
*Attorney, Agent, or Firm*—Charles A. Huggett; Raymond W. Barclay; Howard M. Flournoy

[57] ABSTRACT

Steam stable aluminosilicate zeolite catalysts are prepared by calcining said zeolites at an elevated temperature below about 1100° F. in a closed system having a limited amount of oxygen wherein said zeolite contains organic cations and/or is in intimate contact with a charring agent thereby converting a portion of said organic cations or charring agent to a carbonaceous deposit within the pores of said zeolite in an amount from about 1.5–15 wt. % based on the total weight of the catalyst. Such catalysts are highly useful in the conversion of oxygenates, e.g., methanol to hydrocarbon products.

16 Claims, No Drawings

METHOD OF PRODUCING A STEAM STABLE ALUMINOSILICATE ZEOLITE CATALYST

This is a continuation of copending application Ser. No. 801,881, filed May 31, 1977 and now abandoned.

BACKGROUND OF THE INVENTION

1. Field of the Invention

This invention relates to a method of preparing crystalline aluminosilicate catalysts of for example the ZSM-5 type, having carbon deposited within its pores. Catalysts so prepared have improved steam stability and are highly active in catalytic conversions of oxygenated hydrocarbons such as methanol to olefinic products.

2. Description of the Prior Art

The deleterious effect of steam on zeolites has been the subject of numerous papers and patents. This irreversible damage and loss of catalytic activity is thought to occur from hydrolysis of tetrahedral aluminum from the framework of the zeolite.

It is believed that this is the first instance in which a freshly synthesized aluminosilicate zeolite catalyst has been stabilized against steam deactivation by converting substantial amounts of organic carbon and/or a suitable charring agent adsorbed therein to a carbonaceous deposit within the pores of the zeolite. Coking of catalysts is a known phenomenon and is usually thought to be undesirable because it deactivates the catalyst. Therefore, the desirability of retaining carbonaceous deposits within the pores of a catalyst for the purpose of improving the steam stability of the catalyst is in applicants' view a surprising and unexpected discovery. Apparently the presence of coke prevents the hydrolysis of framework aluminum and the loss of protonic sites thereby suggesting that carbonaceous materials adsorbed on active sites serve to protect the aluminum lattice sites from the abovereferred to hydrolysis.

SUMMARY OF THE INVENTION

This invention is concerned with the preparation of steam stable zeolite catalysts. The method of preparation involves the treatment of a zeolite containing an organic charring agent and/or organic cations. The organic charring agent may be deposited in the zeolite during the crystallization step or impregnated in the zeolite after the air drying, $NH_4$ exchange and/or calcination steps. The coke stabilized catalyst so prepared is particularly useful in catalytic reactions in which steam may be present as a component in the feed or as a reaction product. The process for conversion of methanol to hydrocarbons is considered as one in which the catalyst is severely steamed since water is a major product and the process operates generally at 650°–1000° F. The degree of steam damage increasing with temperature and pressure.

This invention is further concerned with methods of laying down coke within the zeolite pores so as to minimize structural damage to zeolite catalysts caused by steam and to provide a means for keeping in reserve active catalyst sites which would be in excess of those normally required to catalyze a given reaction efficiently. Usually the precent added coke laid down within the pores is about 1.5–15 weight %; about 1.5–6.5 weight % is preferred. The total coke deposited may be as high as 50 weight % or more. Although improved steam stability may be imparted to any suitable crystalline aluminosilicate zeolite containing organic cations (organozeolite) the method of this invention, however, is particularly adaptable to those zeolites broadly designated as ZSM-5 type, i.e., those with or without organic cations. The pre-coking process with respect to the organozeolites may be enhanced by calcining the catalyst in the presence of a suitable hydrocarbon, however, calcining in the presence of a hydrocarbon or other charring agent is essential to the pre-coking of zeolites without organic cations. A nonexhaustive list of charring agents includes unsaturated hydrocarbons such as olefins and diolefins, dicyclic aromatics such as cycle oils from catalytic cracking units and any other charring agents known in the art such as picoline N-oxide and tripropyl N-oxide. When the catalyst is calcined in the presence of a charring agent it is first admixed with a sufficient amount of the charring agent to penetrate the zeolite pores. Therefore, when zeolite catalysts are delibrately subjected to pre-coking in accordance with this invention, carbonaceous material is deposited within the zeolite pores. The location of the coke deposited can be conveniently determined by n-hexane sorption tests on coked and clean burned aliquots of zeolite, both before and after steam treatment. The sorption capacity of the coked stabilized zeolite in accordance herewith is reduced by about 10–50% compared to untreated samples. This indicates that the carbon deposits are within the zeolite crystals. The sorption capacity determination is a more accurate measure of the location of coke deposits than a total coke determination. For example, when a zeolite catalyst is admixed with a binder material, a significant portion of the coke may be located on the binder and require higher coke levels to be effective.

It is believed that the carbonaceous material protects the active catalyst sites by being physically absorbed thereon thus rendering them immune to high temperature steam. Generally speaking, these "coke" covered sites are not catalytically active until the coke is removed. Fresh uncoked catalysts generally have much more activity than is required for the conversion of oxygenated hydrocarbons. Accordingly, excess active sites are protected from deactivation by the coke deposit and revived at such time as they are needed.

The acid sites of the pre-coked catalyst prepared according to the present invention, while fewer in number as compared to an uncoked catalyst, are proportionately more active and more steam stable than the uncoked catalyst.

This application, therefore, is more particularly concerned with a method for stabilizing a crystalline alumino-silicate zeolite catalyst against steam deactivation, wherein said zeolite is characterized by a silica/alumina ratio of at least about 12 and a constraint index within the approximate range of 1 to 12 and when said zeolite is an organozeolite further characterized by having at least about 50% of its active cationic sites occupied by organic cations, comprising intimately admixing at ambient temperature and pressure said zeolite and a sufficient amount of a suitable charring agent and thereafter subjecting said zeolite to calcination at an elevated temperature (for about 1–20 hours) below about 1100° F. (e.g., about 800°–1050° F.) converting a portion of said organic cations and/or charring agent to carbonaceous material in which at least about 1.5–15 weight % thereof is deposited within the pores of said zeolite and wherein the sorption capacity of said zeolite is thereby decreased by about 10–50% and to the novel catalyst resulting therefrom.

DESCRIPTION OF SPECIFIC EMBODIMENTS

The zeolite catalysts herein described are members of a novel class of zeolites exhibiting some unusual properties; they induce conversion of aliphatic hydrocarbons to aromatic hydrocarbons in commercially desirable yields and are also generally highly effective in conversion reactions involving aromatic hydrocarbons. Although they usually have low alumina contents, i.e., high silica to alumina ratios, they are very active even when the silica to alumina ratio exceeds 30. This ratio may advantageously vary from about 10–95 and preferably from about 30–70. This activity is surprising since catalytic activity is generally attributed to framework aluminum atoms and cations associated with these aluminum atoms. These catalysts retain their crystallinity for long periods in spite of the presence of steam at high temperature which induces irreversible collapse of the framework of other zeolites, e.g., of the X and A type. In many environments, the zeolites of this class exhibit very low additional coke forming capability which is conducive to very long times on stream between burning regenerations. Acid activity is, however, irreversibly lost after long contact with high temperature steam. Thus, catalysts of improved steam stability are highly desirous. Acid activity may be quantitatively measured in the laboratory by an alpha test. The alpha value describes the relative activity of the catalyst with respect to a high activity conventional silica-alumina cracking catalyst. Thus, an alpha value of 30 indicates an activity which is 30 times greater than the standard reference catalyst.

To determine the alpha value, n-hexane conversion is determined and converted to a rate constant per unit volume of catalyst and compared with that of a silica-alumina catalyst which is normalized to a reference activity of 1.0 at 1000° F. Catalytic activity of the catalysts are then expressed as a multiple of this standard, i.e., the silica-alumina standard. The silica-alumina reference catalyst contains about 10 weight percent $Al_2O_3$ and the remainder $SiO_2$. This method of determining alpha is more fully described in "Journal of Catalysis," Vol. IV, No. 4, August 1965, pages 527–529. Conventional catalysts also become deactivated by coking during the reaction, and thereafter, for example, require frequent air regenerations to remove the coke deposit by burning it to $CO_2$ and water at high temperatures.

An important characteristic of the crystal structure of this class of zeolites is that it provides constrained access to, and egress from, the intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline aluminosilicate, the oxygen atoms being bonded to the silicon or aluminum atoms at the centers of the tetrahedra. Briefly, the preferred type catalysts useful in this inventive process have a silica to alumina ratio of at least about 12 and a structure providing constrained access to the crystalline free space.

The silica to alumina ratio referred to can be determined by conventional analysis. This ratio is meant to represent, as closely as possible, the ratio in the rigid anionic framework of the zeolite crystal and to exclude aluminum in the binder or in cationic or other form within the channels.

The type zeolites useful in this invention freely sorb normal hexane and as mentioned above have a pore dimension greater than about 5 Angstroms. In addition, the structure should provide constrained access to larger molecules. It is sometimes possible to judge from a known crystal structure whether such constrained access exists. For example, if the only pore windows in a crystal are formed by 8-membered rings of oxygen atoms, then access by molecules of larger cross-section than normal hexane is excluded and the zeolite is not of the desired type. Windows of 10-membered rings are preferred, although, in some instances, excessive puckering or pore blockage may render these catalysts ineffective. Twelve-membered rings do not generally appear to offer sufficient constraint to produce the advantageous conversions desired, although puckered structures exist such as TMA offretite which is a known effective zeolite. Also, structures can be conceived, due to pore blockage or other cause, that may be operative.

Rather than attempt to judge from crystal structure whether or not a catalyst possesses the necessary constrained access, a simple determination of the "constraint index" may be made by passing continuously a mixture of an equal weight of normal hexane and 3-methylpentane over a small sample, approximately 1 gram or less, of catalyst at atmospheric pressure according to the following procedure. A sample of the catalyst, in the form of pellets or extrudate, is crushed to a particle size about that of coarse sand and mounted in a glass tube. Prior to testing, the catalyst is treated with a stream of air at 1000° F. for at least 15 minutes. The catalyst is then flushed with helium and the temperature adjusted between 550° F. and 950° F. to give an overall conversion between 10% and 60%. The mixture of hydrocarbons is passed at 1 liquid hourly space velocity (i.e., 1 volume of liquid hydrocarbon per volume of catalyst per hour) over the catalyst with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "constraint index" is calculated as follows:

$$\text{Constraint Index} = \frac{\log_{10} \text{ fraction of n-hexane remaining}}{\log_{10} \text{ (fraction of 3-methylpentane remaining)}}$$

The constraint index approximates the ratio of the cracking rate constants for the two hydrocarbons. Catalysts suitable for the present invention are those having a constraint index in the approximate range of 1 to 12. Constraint Index (CI) values for some typical catalysts are:

| CAS | C.I. |
|---|---|
| ZSM-5 | 8.3 |
| ZSM-11 | 8.7 |
| ZSM-12 | 2 |
| ZSM-38 | 2 |
| ZSM-35 | 4.5 |
| TMA Offretite | 3.7 |
| Beta | 0.6 |
| ZSM-4 | 0.5 |
| H-Zeolon | 0.5 |
| REY | 0.4 |
| Amorphous Silica-Alumina | 0.6 |

| CAS | C.I. |
| --- | --- |
| Erionite | 38 |

It is to be realized that the above constraint index values typically characterize the specified zeolites but that such are the cumulative result of several variables used in determination and calculation thereof. Thus, for a given zeolite depending on the temperature employed within the aforenoted range of 550° F. to 950° F., with accompanying conversion between 10% and 60%, the constraint index may vary within the indicated approximate range of 1 to 12. Likewise, other variables such as the crystal size of the zeolite, the presence of possibly occluded contaminants and binders intimately combined with the zeolite may affect the constraint index. It will accordingly be understood by those skilled in the art that the constraint index, as utilized herein, while affording a highly useful means for characterizing the zeolites of interest is approximate, taking into consideration the manner of its determination, with the probability, in some instances, of compounding variable extremes. However, in all instances, at a temperature within the above-specified range of 550° F. to 950° F., the constraint index will have a value for any given zeolite of interest herein within the approximate range of 1 to 12.

The class of zeolites defined herein is exemplified by ZSM-5, ZSM-11, ZSM-12, ZSM-35, ZSM-38. Although materials such as erionite, mordenite and faujasite generally have a higher constraint index than ZSM-5 zeolites they nevertheless may also be subjected to the coking procedures of this invention.

U.S. Pat. No. 3,702,886 which describes and claims ZSM-5 is incorporated herein by reference.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-38 is more particularly described in pending U.S. Application Ser. No. 560,412, filed Mar. 20, 1975. This zeoliite can be identified, in terms of mole ratios of oxides and in the anhydrous state, as follows:

$$(0.3-2.5)R_2O:(0-0.8)M_2O:Al_2O_3:xSiO_2$$

wherein R is an organic nitrogen-containing cation derived from a 2-(hydroxyalkyl) trialkylammonium compound and M is an alkali metal cation, and is characterized by a specified X-ray powder diffraction pattern.

In a preferred synthesized form, the zeolite has a formula, in terms of mole ratios of oxides and in the anhydrous state, as follows:

$$(0.4-2.5)R_2O:(0-0.6)M_2O:Al_2O_3:xSiO_2$$

wherein R is an organic nitrogen-containing cation derived from a 2-(hydroxyalkyl)trialkylammonium compound, wherein alkyl is methyl, ethyl or a combination thereof, M is an alkali metal, especially sodium, and x is from greater than 8 to about 50.

ZSM-35 is more particularly described in U.S. Pat. No. 4,016,245, the contests of which are incorporated herein be reference. This zeolite can be identified, in terms of mole ratios of oxides and in the anhydrous state, as follows:

$$(0.3-2.5)R_2O:(0-0.8)M_2O:Al_2O_3:xSiO_2$$

wherein R is an organic nitrogen-containing cation derived from ethylenediamine or pyrrolidine and M is an alkali metal cation, and is characterized by a specified X-ray powder diffraction pattern.

The specific zeolites described, when prepared in the presence of organic cations, are catalytically inactive, possibly because the intracrystalline free space is occupied by organic cations from the forming solution. They may be activated by heating in an inert atmosphere at 1000° F. for one hour, for example, followed by base exchange with ammonium salts followed by calcination at 1000° F. in air. The presence of organic cations in the forming solution may not be absolutely essential to the formation of this type zeolite; however, the presence of these cations does appear to favor the formation of this special type of zeolite. More generally, it is desirable to activate this type catalyst by base exchange with ammonium salts followed by calcination in air at about 1000° F. for from about 15 minutes to about 24 hours.

The catalysts heretofore described are used in an acidic or hydrogen form or they may be base exchanged or impregnated to contain ammonium or a metal cation complement. It is desirable to calcine the catalyst after base exchange. The metal cations that may be present include any of the cations of the metals of Groups IB, IIB and VIII of the Periodic Table and mixtures thereof.

In a preferred aspect of this invention, the catalysts hereof are selected from those also having a crystal framework density, in the dry hydrogen form, of not substantially below about 1.6 grams per cubic centimeter. It has been found that zeolites which satisfy all three of these criteria are most desired because they tend to maximize the production of gasoline boiling range hydrocarbon products. Therefore, the preferred catalysts of this invention are those having a constraint index as defined above of about 1 to about 12, a silica to alumina ratio of at least about 12 and a dried crystal density of not less than about 1.6 grams per cubic centimeter. The dry density for known structures may be calculated from the number of silicon plus aluminum atoms per 1000 cubic Angstroms, as given, e.g., on page 19 of the article on Zeolite Structure by W. M. Meir. This paper, the entire contents of which are incorporated herein by reference, is included in "Proceedings of the Conference on Molecular Sieves, London, April 1967", published by the Society of Chemical Industry, London, 1968. When the crystal structure is unknown, the crystal framework density may be determined by immersing the dry hydrogen form of the zeoliite in an organic solvent which is not sorbed by the crystal. It is possible that the unusual sustained activity and stability of this class of zeolites is associated with its high crystal anionic framework density of not less than about 1.6 grams per cubic centimeter. This high density, of course, must be associated with a relatively small amount of free space within the crystal, which might be expected to result in more stable structures. This free space, however, is important as the locus of catalytic activity.

Crystal framework densities of some typical zeolites are:

| Zeolite | Void Volume | Framework Density |
| --- | --- | --- |
| Ferrierite | 0.28 cc/cc | 1.76 g/cc |
| Mordenite | .28 | 1.7 |
| ZSM-5, -11 | .29 | 1.79 |
| Dachiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

When synthesized in the alkali metal form, the zeolite is conveniently converted to the hydrogen form, generally by intermediate formation of the ammonium form as a result of ammonium ion exchange and calcination of the ammonium form to yield the hydrogen form. In addition to the hydrogen form, other forms of the zeolite wherein the original alkali metal has been reduced to less than about 50 percent by weight of the original alkali metal contained therein usually 0.5 wt. % or less may be used. Thus, as stated hereinabove the original alkali metal of the zeolite may be replaced by ion exchange with other suitable ions of Groups IB, IIB and VIII of the Periodic Table including, by way of example, zinc, copper or platinum groups metals and combinations thereof. The amount of metal so utilized can vary between wide limits, depending, interalia, on intended reaction conditions, etc. However, catalysts of the invention if desired may contain from about 0.01 to about 30 weight % based on the weight of the total catalyst; preferably from about 0.5 to about 10 weight % metal is present in the catalyst.

One embodiment of this invention resides in the use of a porous matrix together with the zeolites previously described. The zeolites can be combined, dispersed or otherwise intimately admixed with a porous matrix in such proportions that the resulting product contains from 1% to about 95% by weight, and preferably from 10% to about 70% by weight of the zeolite in the final composite.

The term "porous matrix" includes inorganic compositions with which the aluminosilicates can be combined, dispersed or otherwise intimately admixed wherein the matrix may be active or inactive. It is to be understood that the porosity of the compositions employed as a matrix can either be inherent in the particular material or it can be introduced by mechanical or chemical means. Representative matrices which can be employed include metals and alloys thereof, sintered metals and sintered glass, asbestos, silicon carbide aggregates, pumice, firebrick, diatomaceous earths, alumina and inorganic oxides. Inorganic compositions especially those of a siliceous nature are preferred. Of these matrices, inorganic oxides such as clay, chemically treated clay, silica, alumina, and silica-alumina are highly advantageous.

The ZSM-5 can be conveniently prepared in accordance with U.S. Pat. No. 3,702,886. This patent as previously indicated and the aforementioned U.S. Pat. Nos. 3,709,979, 3,775,501 and 3,832,449 are incorporated herein by reference for all they disclose concerning the synthesis and chemical and physical properties of ZSM-5 type zeolites.

In a preferred embodiment, an organic cation ZSM-5 (low sodium) is converted to a precoked, steam stable and active catalyst. Low sodium ZSM-5 as disclosed herein differs from conventional ZSM-5 in two aspects: (1) n-propylamine or other organic salt is substituted for tetrapropyl ammonium salts or materials which when reacted give a tetrapropyl ammonium salt; (2) the form as synthesized contains less than about 0.5% Na. Any suitable organic cations, compounds or precursors therefor known to the art may be advantageously used in synthesizing the organic cation containing zeolites disclosed herein, such as tetraalkylammonium (preferably $C_2$–$C_8$ alkyl), 2-(hydroxyethyl) trimethylammonium chloride; 1,4-butanediamine, ethylenediamine and pyrrolidine or their precursors. Quaternary organic compounds are preferred.

EXAMPLE 1

A low sodium TPA (tetrapropylammonium) ZSM-5 catalyst (carbon content 5.25 wt. %, nitrogen content of 1.4 wt. %) was sealed in a stainless steel tube. No effort was made to remove the air in the container. The tube was heated in stages for 16 hours at gradually increasing temperatures: 580°, 650°, 700°, 800° F. The treatment at 700° F. actually extended for 64 hours. After each treatment, the zeolite material was sampled and analyzed for residual carbon and nitrogen.

The final sample of this series (800° F. calcined) contained 1.6 wt. % carbon and only 30% of the original nitrogen content. The n-hexane sorption capacity of this sample was measured before and after the coke burn to determine the location of the residual carbon.

Coke determinations were carried out on a commercial Thermogravimetric Apparatus. The samples were heated in a helium flow at 20° C./min to 550° C. The weight loss during this time was classified as "adsorbed material". After reaching constant weight, the purge gas was switched to air. The weight loss due to this air burn was classified as "coke".

The n-hexane sorption capacities of the zeolite catalysts, both before and after coke removal, were determined on the TGA apparatus at the following conditions: 130° C. $p_{mm}$ (n-hexane) 75, $P/Po = 0.02$. The results are presented below:

| Catalyst | Wt.% $nC_6$ sorption coke stabilized sample | Wt.% Coke | Wt.% $nC_6$ sorption of uncoked sample | % loss in sorption capacity |
| --- | --- | --- | --- | --- |
| Example 1 | 5.0 | 1.6 | 6.1 | 18 |

The reduced sorption of the coked sample indicates that the carbonaceous residue is within the zeolitic pores.

This coked material was evaluated for steam stability under the following test conditions: 16 hours, 900° F., 60 psig, $H_2O$. The alpha test results are presented below:

| Catalyst | Fresh | After Steam Alpha Values | Regenerated |
| --- | --- | --- | --- |
| Ex. 1 no coke | 198 | 21 | 21 |
| Ex. 1 coke stabilized | 157 | 16 | 165 |

Upon regeneration the coke stabilized catalyst showed complete recovery of acid cracking activity. This illustrates the effectiveness of the carbonaceous material in preventing the hydrolysis of framework aluminum and subsequent activity loss.

In Examples 2-6 below, we show that the pure zeolite (void of matrices or organic template ions) is deactivated by either steam or coke. However, steam deactivation is irreversible while the coke stabilized catalyst can be restored to its fresh activity by air regeneration. The coked zeolite Example 5 is also more steam stable as compared to Example 2. Furthermore, contrary to expectations, after air regeneration, the coked zeolite (Example 5) is more active than the fresh catalyst as shown by the comparison of Example 6 to Base A.

The next group of Examples (7 through 11) illustrate that the above observations are equally applicable to a zeolite extrudate. Commercial zeolite catalysts are usually prepared as extrudates - slurrying with a diluent such as alumina and extruding to form a more attrition-resistant catalyst.

The data in the Tables set forth hereinafter are based on the fact that we have found that the hexane cracking activity (alpha) of a catalyst is roughly proportional to the methanol conversion activity. With the alpha-test (a measure of acidic catalyst sites) we are able to evaluate more catalysts and process variables. An alpha value of $\geq 30$ describes a catalyst with sufficient activity for methanol conversion; one of $\leq 10$ is one which is badly spent and would normally be discarded. Hence, our steaming procedure, 16 hours at 900° F. with water vapor pressure of 60 psig is tantamount to accelerated aging in a methanol conversion test. It should also be pointed out that most of the activity is lost during the first 2 hours of steaming at 900° F. or higher.

COKING EXPERIMENTS ON HZSM-5

Examples (2) A zeolite catalyst, "base A" (HZSM-5) having a hexane cracking activity of 193 (alpha) was steamed for 16 hours at 900° F., 60 psig water vapor pressure.

(3) An aliquot of base A was precoked by treating with 1-heptene for 16 hours at 1-LHSV, 1000° F., and atmospheric pressure to 5.7 wt. % coke and 18% loss in n-hexane sorption capacity.

(4) An aliquot of Example 3 was regenerated in air, 16 hours at 1000° F.

(5) An aliquot of Example 3 was steamed as in Example 1.

(6) An aliquot of Example 5 was regenerated as in Example 4.

(7) A zeolite extrudate "base B" having a hexane cracking activity of 144 alpha is steamed as in Example 1.

(8) An aliquot of base B was precoked as in Example 3 to 6.3 wt. % coke with a 23% loss in n-hexane sorption capacity.

(9) An aliquot of Example 8 was regenerated as in Example 4.

(10) An aliquot of Example 8 was steamed as in Example 1.

(11) The product from Example 10 was regenerated as in Example 4.

TABLE 1

| Example | Catalyst | Activity, alpha |
|---|---|---|
| Base A | Zeolite HZSM-5 | 193 |
| 2 | Base A + steam | 18.5 |
| 3 | Base A + coke stabilized | 100 |
| 4 | Ex. 3 + regeneration | 198 |
| 5 | Ex. 3 + steam | 30 |
| 6 | Ex. 5 + regeneration | 225 |
| Base B | HZSM-5 zeolite extrudate | 144 |
| 7 | Base B + steam | 16.5 |
| 8 | Base B, coke stablized | 84 |
| 9 | Ex. 8 + regeneration | 212 |
| 10 | Ex. 8 + steam | 28 |
| 11 | Ex. 10 + regeneration | 142 |

Table 2 below shows the use of different coking agents, including the carbon of organic template ions, cycle oils, or other charring agents.

In Examples 12-14, the coking is carried out by pyrolysis of zeolite which still contains its organic template ions. (In normal commercial practice, these template ions are removed by calcining in an inert gas stream-Nitrogen-; the zeolite must then be exchanged with an ammonium salt solution and recalcined). The coke formed here is probably more intimately involved with the sites within the zeolite cavities. The effectiveness of a mere 1½% coke is observed in these example.

Examples 15 and 16 show that cyclic stock is a suitable coke source. The advantage derived here is the use of low cost, generally abundant materials, many of which cannot be economically upgraded.

Examples 17-19 demonstrate the effectiveness of a charring agent; -4-picoline N-oxide. This is an efficient method for coking catalysts.

RESULTS WITH COKING AGENTS

Examples

(12) A sample of organozeolite, base C, TPA ZSM-5 having a cracking activity of 198 (alpha) after activation was coked by heating in a sealed bomb at 450° C. for 16 hours (to 1.6% C), 18% loss in n-hexane sorption capacity.

(13) An aliquot of product from Example 12 was steamed as in Example 1.

(14) An aliquot of product from Example 13 was tested and regenerated as in Example 4, but for 30 minutes.

(15) A 10 g aliquot of base C was soaked with 5 ml Torrance light cycle oil (400°-650° F.) and heated in sealed stainless steel tube for 16 hours at 950° F., then steamed as in Example 13 (44.6% coke) and a 41% loss in n-hexane sorption capacity.

(16) An aliquot from Example 15 was tested and regenerated as in Example 4.

(17) An aliquot of base C was coked by heating with 4-picoline-NO at 510° C. for 15 hours in a sealed tube (2.9% coke) and a 28% loss in n-hexane sorption capacity.

(18) An aliquot of product from Example 17 was tested and regenerated as in Example 4.

(19) Product of Example 17 was steamed as in Example 2.

(20) Product of Example 19 was tested and regenerated and in Example 16.

TABLE 2

| Example | Catalyst | Alpha |
|---------|----------|-------|
| Base C | TPA ZSM-5, clean burned | 198 |
| Base C steamed | | (19) |
| 12 | Base C, coke stabilized | 157 |
| 13 | Ex. 12 + steam | 16 |
| 14 | Ex. 13 + regeneration | 165 |
| 15 | Base C coke stabilized by light cycle oil + steam | 30 |
| 16 | Ex. 15 + regeneration | 169 |
| 17 | Base C + coke stabilized by 4-picoline-NO | 32 |
| 18 | Ex. 17 + regeneration | 140 |
| 19 | Ex. 17 + steam | 36 |
| 20 | Ex. 19 + regeneration | 419 |

(21) A catalyst, base D, consisting of 40/1 $SiO_2/Al_2O_3$ HZSM-5 having a cracking activity alpha 400 was coked as in Example 17 using picoline-NO (6.2% Coke).

(22) Catalyst from Example 21 was regenerated in air for 60 minutes at 1000° F.

(23) Base D was steamed as in Example 1.

(24) Catalyst of Example 23 was regenerated as in Example 22.

(25) An aliquot of coked base D of Example 21 was steamed as in Example 1.

(26) Catalyst of Example 25 was regenerated as in Example 22.

TABLE 3

| Example | Catalyst Base D | alpha 400 |
|---------|-----------------|-----------|
| 21 | Base D + Coke | 55 |
| 22 | Ex. 21 + regeneration | 440 |
| 23 | Base D + steam | 13 |
| 24 | Ex. 23 + regeneration | 19 |
| 25 | Ex. 21 (Base D + Coke) + steam | 41 |
| 26 | Ex. 25 + regeneration | 1000 |

These examples (21–22 and 25–26) demonstrate the efficiency of precoking in protecting the zeolite, e.g., HZSM-5 with a 40/1 $SiO_2/Al_2O_3$ ratio, from irreversible damage caused by steam (see Examples 23–24).

In Table 4 below we show that the precoking concept is not limited to the zeolites alone but can apply equally well if the zeolite contains an active metal (Examples 27–30) including Group IB, IIB and the transition metals in Group VIII of the Periodic Table. It should be noted that alpha values for Examples 27–30 are determined after the metal components have been deactivated with $H_2S$.

METAL CONTAINING ZEOLITES

Examples

(27) A cobalt-loaded HZSM-5 extrudate, Base E having a cracking activity of 90 (alpha) (after using $H_2S$ to deactivate Co) was steamed as in Example 1.

(28) An aliquot of product from Example 27 was regenerated as in Example 4, but for 90 minutes.

(29) An aliquot of Base E was coked as in Example 3, then steamed as in Example 2 (coke=6.0 wt. %).

(30) An aliquot of product from Example 29 was regenerated as in Example 4, but for 60 minutes.

TABLE 4

| Example | Catalyst | Hexane Cracking Activity alpha(after excess $H_2S$) |
|---------|----------|------|
| Base E | Co-loaded HZSM-5 extrudate | 90 |
| 27 | Base E + steam | 53 |
| 28 | Ex. 27 + regeneration | 53 |
| 29 | Base E, coke stabilized + steam | 38 |
| 30 | Ex. 29 + regeneration | 154 |

The next group of Examples 31–34 illustrate that the steam treatment removes mainly the so-called "adsorbed" carbonaceous material while the "residual" carbon is essentially retained under the same steam test conditions.

Catalysts 31–33 used in this study were precoked with three 6 ml zeolite samples receiving 1-heptene at 1 LHSV, 900° F. atmospheric pressure for 16 hours. Coked catalysts were purged with helium at 900° F. for 1–2 hours. Aliquots were subjected to the alpha test and the balance steamed for 16 hours at 900° F., 60 psig steam.

In Example 34, the TPA, low sodium ZSM-5 was coked by a thermal treatment for 16 hours in a sealed, stainless steel cyclinder. After this treatment about 25% of the nitrogen in the fresh catalyst was retained. After heating in an inert gas, to remove this nitrogen, 1.6 wt. % carbon remained. The results of the coke determinations (carried out on Thermogravimetric Apparatus as described hereinabove) are listed in Table 5.

TABLE 5

| Ex. | Catalyst | Coking Method | Before Steam Treatment | | | After Steam Treatment | | |
|-----|----------|---------------|------|------|------|------|------|------|
| | | | "adsorbed" | "coke" | Total | "adsorbed" | "coke" | Total |
| 31 | HZSM-5 | olefin | 4.7 | 5.7 | 10.4 | 1.5 | 5.7 | 7.2 |
| 32 | HZSM-5 extrudate | olefin | 4.1 | 6.3 | 10.4 | 2.0 | 5.4 | 7.4 |
| 33 | CoZSM-5 extrudate | olefin | — | — | — | 3.5 | 5.5 | 9.0 |
| 34 | Low Na TPAZSM-5 | TPA decomp. | 1.6 | 1.6 | 3.2 | 0.5 | 1.3 | 1.8 |

The following group of Examples 35–37 illustrate the coking or charring in accordance with this invention of a ZSM-35 and a ZSM-38 zeolite catalyst containing organic cations. The organozeolites (Examples 35–37) were subjected to air calcination at 1000° F. for 3 hours. The results indicate that in particular, pyrrolidine, choline chloride, (2-hydroxyethyl) trimethylammonium and 1,4-butanediamine are effective charring agents, not requiring as in Example 1, a closed container in order that the organic cations deposit significant coke.

| Ex. | Catalyst | % coke after calcination | % reduction in n sorption capacity |
|---|---|---|---|
| 35 | Pyrrolidine ZSM-35 | 2.2 | 10.3 |
| 36 | 1,4-butanediamine ZSM-35 | 2.9 | 19 |
| 37 | Choline chloride ZSM-38 | 2.9 | 15 |

It is evident from the foregoing data that the concept of this invention extends the useful life of zeolitic catalysts which come into contact with steam or components thereof significantly improving the steam stability of ZSM-5 type catalysts both in the pure zeolite form and in extrudates. It is further evident that only preferred embodiments have been exemplified and that the scope of this invention is not limited thereto but extends to those variations obvious to one of skill in the art.

What is claimed is:

1. A method for stabilizing a crystalline alumino-silicate zeolite catalyst against steam deactivation wherein said zeolite is characterized by a silica/alumina ratio of at least about 12 and a constraint index within the approximate range of 1 to 12 and when said zeolite is an organozeolite further characterized by having at least about 50% of its active cationic sites occupied by organic cations comprising intimately admixing said zeolite and a sufficient amount of a suitable charring agent and thereafter subjecting said zeolite catalyst to calcination at an elevated temperature below about 1100° F. in a closed system having a limited amount of oxygen thereby converting a portion of said organic cations and/or charring agent to carbonaceous material of which at least about 1.5–15 wt. % is deposited and retained within the pores of said zeolite catalyst after said calcination.

2. The process of claim 1 wherein the sorption capacity of said catalyst is decreased by about 10 to 50% after conversion of organic cations and/or charring agent to carbonaceous material.

3. The process of claim 1 wherein the calcination temperature is from about 800° to about 1050° F.

4. The process of claim 1 wherein prior to admixing with a charring agent the zeolite is first calcined at a temperature of from about 700°–1000° F., in an inert atmosphere, ammonium ion exchanged, and thereafter mixed with said charring agent and calcined at a temperature of from about 800°–1050° F. for from about 1 to 20 hours.

5. The process of claim 1 wherein about 1.5–6.5 wt. % of carbonaceous material is deposited within the pores of the zeolite catalyst.

6. The process of claim 1 wherein the catalyst is selected from the group consisting of ZSM-5, ZSM-11, ZSM-12, ZSM-35 and ZSM-38.

7. The process of claim 6 wherein the catalyst is ZSM-5.

8. The process of claim 6 wherein the catalyst is a low sodium zeolite.

9. The process of claim 8 wherein the catalyst is a low sodium tetrapropylammonium ZSM-5 zeolite.

10. The process of claim 1 wherein the ZSM-5 type catalyst contains at least one metal cation selected from the group consisting of metals selected from Groups IB, IIB and VIII of the Periodic Table.

11. The process of claim 1 wherein the charring agents are selected from the group consisting of unsaturated hydrocarbons, dicyclic aromatics, picoline N-oxide and tripropyl N-oxide.

12. The process of claim 11 wherein the unsaturated hydrocarbons are selected from olefins, diolefins and the dicyclic aromatics are selected from cycle oils derived from catalytic cracking units.

13. The process of claim 1 wherein said zeolite catalyst is an organozeolite which is subjected to calcination without prior admixing with a charring agent.

14. The process of claim 13 wherein the organozeolite is air calcined.

15. The process of claim 14 wherein the catalyst is selected from an organo-ZSM-35 and organo-ZSM-38.

16. The process of claim 7 wherein the organic cations are selected from pyrrolidine, 1,4-butanediamine and choline chloride.

* * * * *